2,868,957

METHOD OF INCREASING THE CARBON CONTENT OF DEPOSITS OF IRON-BASE ALLOYS MADE FROM FILLED TUBES

Arthur T. Cape, Los Angeles, Calif., assignor to Coast Metals, Inc., Little Ferry, N. J., a corporation of Delaware No Drawing. Application October 2, 1956
Serial No. 613,378

4 Claims. (Cl. 219—146)

This invention relates generally to the use of filled tubes for making hard facing iron base alloys in automatic welding, but has reference more particularly to a method of insuring that such deposits will contain a minimum of about 3.5% carbon.

One of the difficulties in the use of filled tubing or tube wires in automatic welding is the loss of carbon due to the presence of manganese oxide in the flux. In the Unionmelt method of welding, for example, the tube wire is fed automatically through a bed of granulated flux, and when the arc is struck on the base metal, a portion of the flux melts, covering the weld. Manganese oxide is used, in one form or another, primarily for the purpose of allowing the slag to break off easily from the weld, for if the slag adheres too tightly to the metal, then on succeeding passes in the welding, it becomes entrapped, giving rise to various troubles.

The tubing used in such automatic welding is necessarily thin-walled, so as to enable it to be coiled for convenience of feeding, and the inside diameter of the tube must also be maintained within narrow limits for the same reason. For example, tubing for tube wire of $3/16''$ O. D. is made from strip .020" thick and .718" wide; tubing for tube wire of $5/32''$ O. D. is made from strip .015" thick and .624" wide; and tubing for tube wire of $1/8''$ O. D. is made from strip .012" thick and .524" wide.

These limitations of wall thickness and diameter render it difficult to incorporate substantial amounts of carbon in either the tube itself or in the contents of the tube. The carbon content of the tube comprising the tube wire is usually about .10%, so that even if high carbon strip is used for making the tube, only a very small portion of the carbon in the weld deposit can come from the steel of the tube.

On the other hand, weld deposits of good hard facing iron-base alloys usually require a minimum of 3.5% carbon, so that the major portion of this carbon must, of necessity, come from the ingredients which comprise the contents of the tube. However, due to the fact that carbon has a low density, i. e., requires a large volume for a given weight, it is difficult to obtain the necessary carbon in the weld deposit from the ingredients which are usually used in the tube for making good hard facing iron-base alloys.

In making a certain high-chromium iron-base weld deposit, for example, a tube, such as described, was filled with high carbon chromium metal (containing 10% carbon), plus minor amounts of ferrosilicon (containing 50% silicon), graphite, high carbon ferromanganese and various binders, including sodium silicate. The amount of high carbon chromium metal which was used was the maximum which could be placed in the tube to produce a weld deposit containing the desired amount of chromium, and the amount of carbon in such chromium metal was the maximum available. This tube on being melted with the automatic welding machine, using a flux containing manganese oxide, produced an iron base deposit containing 24% chromium, about 1% silicon, about 1.5% manganese (which came from the reduction of the manganese oxide in the flux), but somewhat less than 3.3% carbon.

Using the same tube, and same filler, but incorporating .5% (by weight of the filled tube) of silica ($SiO_2$), the deposit was of the same composition, but contained 3.55% carbon. In general, it was found that the carbon content of the deposit was invariably from .15% to .35% less without the silica addition than with the silica addition.

The amount of silica ($SiO_2$) which may be incorporated in the filled rod may vary from any appreciable amount, but usually not less than about .25% (by weight of the filled tube), and up to any amount which can be incorporated in the tube, so as to produce a deposit of the iron-base alloy, containing up to about 5% of carbon. In general, the amount of silica incorporated should be sufficient to insure a carbon content of at least 3.4% carbon in the deposit.

While an increase in the carbon content of .15% to .35% may not appear to be significant, nevertheless with chromium containing alloys, as the carbon content increases to over 3.4%, the effect of hardness becomes disproportionately large. This is particularly true with carbon contents of 3.75% and over, so that the value of adding the silica means that with greater certainty the higher carbon contents can be produced in the welds.

The silica is preferably used in the form of silica flour, and fills in the interstices between the particles of the other ingredients in the tube.

It will be understood that various changes may be made in the method as described, and in the ingredients used to form the weld deposit, without departing from the spirit of the invention or the scope of the appended claims.

Thus having described my invention, I claim:

1. A weld rod comprising a steel tube, a filler for said tube comprising ingredients for forming a weld deposit of a hard-facing iron-base alloy, when the filled tube is melted, and including silica in amounts sufficient to prevent substantial loss of carbon in the deposit.

2. A weld rod, as defined in claim 1, in which the amount of silica is sufficient to maintain the carbon content in the deposit at at least 3.4%.

3. A weld rod, as defined in claim 1, in which the silica content is at least about .25% by weight of the filled tube.

4. A weld rod comprising a thin-walled steel tube, a filler for said tube comprising ingredients for forming with the steel tube a weld deposit of a hard-facing high-carbon, iron-base alloy, and including silica, in the form of silica flour, filling the interstices between said ingredients, the amount of silica flour being not less than about .25% by weight of the filled tube and sufficient to maintain the carbon content in the deposit at not less than 3.4%.

References Cited in the file of this patent

UNITED STATES PATENTS

| | | |
|---|---|---|
| 1,441,685 | Jones | Jan. 9, 1923 |
| 1,528,878 | Holslag | Mar. 10, 1925 |
| 1,650,905 | Mills | Nov. 29, 1927 |
| 2,016,585 | Basore et al. | Oct. 8, 1935 |
| 2,219,462 | Wissler | Oct. 29, 1940 |

FOREIGN PATENTS

| | | |
|---|---|---|
| 147,270 | Great Britain | July 14, 1920 |